US009148833B1

(12) United States Patent
Singh et al.

(10) Patent No.: US 9,148,833 B1
(45) Date of Patent: Sep. 29, 2015

(54) METHODS AND SYSTEMS FOR USING REVERSE-LINK MEASUREMENT PARAMETERS FOR MAKING HANDOFF DECISIONS

(71) Applicant: Sprint Spectrum L.P., Overland Park, KS (US)

(72) Inventors: Jasinder P. Singh, Olathe, KS (US); Deveshkumar N. Rai, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 168 days.

(21) Appl. No.: 13/668,720

(22) Filed: Nov. 5, 2012

(51) Int. Cl.
*H04L 1/00* (2006.01)
*H04W 36/00* (2009.01)

(52) U.S. Cl.
CPC ............................... *H04W 36/0094* (2013.01)

(58) Field of Classification Search
None
See application file for complete search history.

(56) References Cited

U.S. PATENT DOCUMENTS

| | | | |
|---|---|---|---|
| 7,466,682 B1 | 12/2008 | Ribas et al. | |
| 7,499,700 B2 | 3/2009 | Dillon et al. | |
| 7,580,362 B2 | 8/2009 | Timus | |
| 2004/0022213 A1 | 2/2004 | Choi et al. | |
| 2005/0101328 A1 | 5/2005 | Son et al. | |
| 2005/0107110 A1 | 5/2005 | Vasudevan et al. | |
| 2006/0135173 A1 | 6/2006 | Vannithamby | |
| 2008/0182609 A1 | 7/2008 | Somasundaram et al. | |
| 2009/0227255 A1* | 9/2009 | Thakare | 455/434 |
| 2009/0275334 A1 | 11/2009 | Xie et al. | |
| 2010/0056153 A1* | 3/2010 | Attar et al. | 455/436 |
| 2010/0172329 A1* | 7/2010 | Yokoyama et al. | 370/332 |
| 2010/0255859 A1* | 10/2010 | Park et al. | 455/458 |
| 2010/0279715 A1 | 11/2010 | Alanara et al. | |
| 2011/0021197 A1* | 1/2011 | Ngai | 455/436 |
| 2011/0305137 A1 | 12/2011 | Chu et al. | |

FOREIGN PATENT DOCUMENTS

WO 2013/037842 A1 3/2013

OTHER PUBLICATIONS

Tripathi, Suyash et al., LTE E-UTRAN and its Access Side Protocols; Radisys, pp. 1-17, Sep. 2011.

(Continued)

*Primary Examiner* — Kouroush Mohebbi

(57) ABSTRACT

Methods and systems for making decisions regarding handing off a user-equipment device from a serving base station to a neighboring base station. Base stations in a wireless communication network measure parameters regarding forward-links from the base stations and reverse-links to the base stations. Each base station transmits its measured parameters to its neighboring base station(s). Each base station can determine differences between the parameters it measures and the parameters measured by a neighboring base station. The differences indicate whether the quality of service provided by the serving base station is greater than the quality of service provided by a neighboring base station. The servicing base station transmits the differences to user-equipment devices served by that base station. The user-equipment device compares the differences pertaining to the serving base station and multiple neighboring base stations and selects a neighboring base station to which the user-equipment device is to be handed over.

23 Claims, 5 Drawing Sheets

(56) References Cited

OTHER PUBLICATIONS

Sharetechnote, Handover, pp. 1-15, downloaded from the World Wide Web at http://www.sharetechnote.com/html/Handover_LTE.html on Oct. 29, 2012.

Steepest Ascent Ltd, Control Signaling—Downlink Control Channel, pp. 1-13, downloaded from the World Wide Web at http://www.steepestascent.com/content/mediaassets/html/LTE/Help/PDCCH.html on Oct. 29, 2012.

Measurement reports UMTS and LTE, pp. 1-4, document date: May 19, 2010, downloaded from World Wide Web at http://wireless3g4g.blogspot.com/2010/05/measurement-report-umts-and-lte.html on Oct. 29, 2012.

LTE Measurements by UE, pp. 1-3, document date: Feb. 19, 2012, downloaded from World Wide Web at http://ltesimplified.blogsport.com/2012/02/lte-measurements-by-ue.html on Oct. 30, 2012.

ML1 Serving Cell Measurement Response, pp. 1-9, document date: Jan. 12, 2012, downloaded from World Wide Web at http://lteguide.blogsport.com/2012/01/ml1-serving-cell-measurement-response.html on Nov. 16, 2012.

Katumba, Brian et al., The LTE Access Procedure, Department of Computer Science and Engineering and Department of Signals and Systems, Chalmers University of Technology, Gothenburg, Sweden, 6 pages, May 13, 2011.

Rao, V. Srinivasa et al., Interoperability in LTE, Webbuyersguide.com, pp. 1-12, Mar. 12, 2010.

Amirijoo, Mehdi et al., Neighbor Cell Relation List and Physical Cell Identity Self-Organization in LTE, Wireless Access Networks, Ericsson Research, Ericsson AB, Sweden, 5 pages, Feb. 28, 2008.

Cell Reselection Procedures in LTE, downloaded from the World Wide Web at https://sites.google.com/site/lteencyclopedia/cell-reselection-procedures-in-lte on Oct. 23, 2012, pp. 1-4.

* cited by examiner

METHODS AND SYSTEMS FOR USING REVERSE-LINK MEASUREMENT PARAMETERS FOR MAKING HANDOFF DECISIONS

BACKGROUND

Unless otherwise indicated herein, the elements described in this section are not prior art to the claims and are not admitted to be prior art by inclusion in this section.

A user-equipment (UE) device, such as a cellular phone, operating within a first radio frequency (RF) coverage area provided by a base station can be handed over from that base station to a base station providing a second RF coverage area. Handing over the UE device permits a communication session (such as voice call or internet browsing session) occurring via the UE device to continue as the UE device is moved from the first coverage area to the second RF coverage area.

RF signals transmitted from a base station within a coverage area to the wireless UE device can be referred to as forward-link signals. RF signals transmitted from the UE device to the base station can be referred to as reverse-link signals. Handing over the UE device from the first RF coverage area to the second RF coverage area can be based on a forward-link signal.

OVERVIEW

This application describes several example embodiments, at least some of which pertain to using reverse-link measurements to make decisions regarding whether to hand over a user-equipment device from a serving base station to another base station.

In one respect, an example embodiment can take the form of a method comprising (i) determining, at a first base station, a first reverse-link noise measurement pertaining to one or more reverse-links to the first base station, (ii) receiving, at the first base station, a second reverse-link noise measurement pertaining to one or more reverse-links to a second base station neighboring the first base station, (iii) determining, at the first base station, a difference between the first reverse-link noise measurement and the second reverse-link noise measurement, and (iv) transmitting, from the first base station to a user-equipment device served by the first base station, data indicating the difference between the first reverse-link noise measurement and the second reverse-link noise measurement.

In another respect, an example embodiment can take the form of a method comprising (i) determining, at a user-equipment device operating in an idle mode, a difference in reverse-link noise measured by a first base station currently serving the user-equipment device and reverse-link noise measured by a second base station that neighbors the first base station, (ii) selecting, based on the difference in reverse-link noise determined at the user-equipment device, the second base station to serve the user-equipment device instead of the first base station, and (iii) initiating, using the user-equipment device in response to selecting the second base station, handoff of the user-equipment device from the first base station to the second base station.

In yet another respect, an example embodiment can take the form of a user-equipment device comprising: (i) a wireless communication interface that receives first reverse-link noise data that indicates a difference in reverse-link noise measured by a first base station currently serving the user-equipment device and reverse-link noise measured by a second base station that neighbors the first base station, (ii) a processor, and (iii) a data storage device storing computer-readable program instructions executable by the processor to perform a set of functions. The set of functions comprises (i) selecting, based on the first reverse-link noise data received by the wireless communication interface, the second base station to serve the user-equipment device instead of the first base station, and (ii) initiating, in response to selecting the second base station, handoff of the user-equipment device from the first base station to the second base station.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, in which.

DETAILED DESCRIPTION

I. Introduction

In addition to handing over a user-equipment (UE) device performing a communication session, the UE device can be handed over from a serving base station to another base station while the UE device is operating in an idle mode. This description describes example embodiments that pertain to using reverse-link measurements to make decisions regarding whether to hand over a UE device. The reverse-link measurements can, for example, include parameters indicating reverse-link noise measurements made by base stations within a wireless communication network, Random Access Channel (RACH) capacity parameters, or Uplink Data Error rate parameters that indicate how well the reverse-link is performing.

In this description, the articles "a" or "an" are used to introduce elements of the example embodiments. The intent of using those articles is that there is one or more of the elements. The intent of using the conjunction "or" within a described list of at least 2 terms is to indicate that any of the listed terms or any combination of the listed terms. The use of ordinal numbers such as "first," "second," "third" and so on is to distinguish respective elements rather than to denote a particular order of those elements. For purposes of this description, the terms "hand off" and "hand over" can be used interchangeably as can the terms "handing off" and "handing over" and the terms "handed off" and "handed over."

The diagrams and flow charts shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (for example, machines, interfaces, functions, orders, or groupings of functions) can be used instead. Furthermore, various functions described as being performed by one or more elements can be carried out by a processor executing computer-readable program instructions or by any combination of hardware, firmware, or software.

II. Example Architecture

Figure 1:
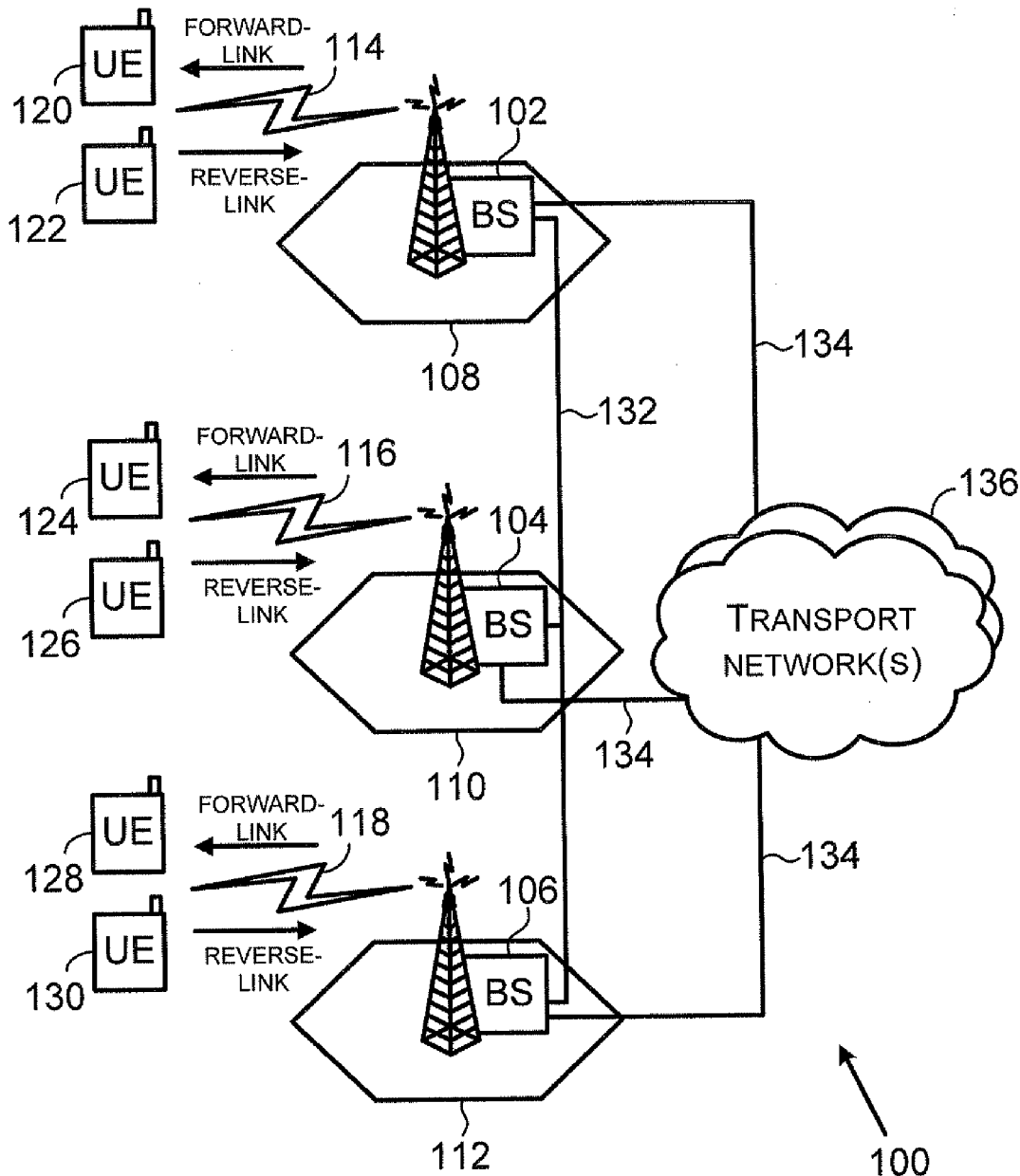
FIG. 1 is a diagram depicting a system in accordance with one or more of the example embodiments.

FIG. 1 is a diagram depicting a system 100 in accordance with one or more of the example embodiments. System 100 can be referred to as a communication network or, more particularly, a wireless communication network. System 100 includes multiple base stations, represented by base stations 102, 104, and 106. System 100 can include a different number of base stations than is shown in FIG. 1. Each base station shown in FIG. 1 can include a transceiver to transmit and receive radio frequency (RF) signals. Each of those base stations can include a transceiver tower, as shown in FIG. 1, but is not so limited.

The RF signals transmitted by each base station provide a coverage area in which UE devices can carry out wireless communications over an air interface within the coverage area. In FIG. 1, the coverage areas provided by the base stations 102, 104, and 106 are coverage areas 108, 110, and 112, respectively. The air interfaces within those coverage areas are air interfaces 114, 116, and 118, respectively. For simplicity, each coverage area is area is shown as a hexagon, but each coverage area is not so limited. For clarity of FIG. 1, none of the coverage areas of system 100 is shown as overlapping another coverage area. A person skilled in the art will understand that each coverage area can overlap or be overlapped by another coverage area.

System 100 includes multiple UE devices, represented by UE devices 120, 122, 124, 126, 128, and 130. In one respect, a UE device can be a mobile UE device. A mobile UE device can be moved from a first coverage area to a second coverage area and operate with a base station while moving between those coverage areas. In another respect, a UE device can be a stationary UE device that is configured for operating at a fixed location. The fixed location may be limited to a location at which the stationary UE device can receive electrical power to operate the UE device.

The RF signals transmitted via a UE device to a base station can be referred to as reverse-link signals or reverse-link communications. The RF signals transmitted from a base station to a UE device can be referred to a forward-link signals or forward-link communications.

In practice, each base station can communicate with a UE device over an air interface (for example, air interface 114, 116, or 118) according to one or more air interface protocols, examples of which include LTE, CDMA, WiMAX, IDEN, GSM, GPRS, UTMS, EDGE, MMDS, WIFI, BLUETOOTH, and other protocols now known or later developed. The principles of the example embodiments may be applicable in various ones of these protocols. For simplicity, however, this description will focus specifically on implementation in LTE as described herein.

System 100 can include inter-base-station communication link 132 that connects each base station to at least one neighbor base station. In accordance with the LTE implementation, communication link 132 can comprise an X2 link. System 100 can include communication links 134 to provide base stations 102, 104, and 106 with connectivity to one or more transport networks 136, such as the public switched telephone network (PSTN) or the Internet for instance. With this arrangement, a UE device that is positioned within the coverage area of a base station and that is suitably equipped may engage in air interface communication with the base station and can thereby communicate with remote entities on the transport network(s) and/or with other UE devices served by a base station of system 100.

Figure 2:
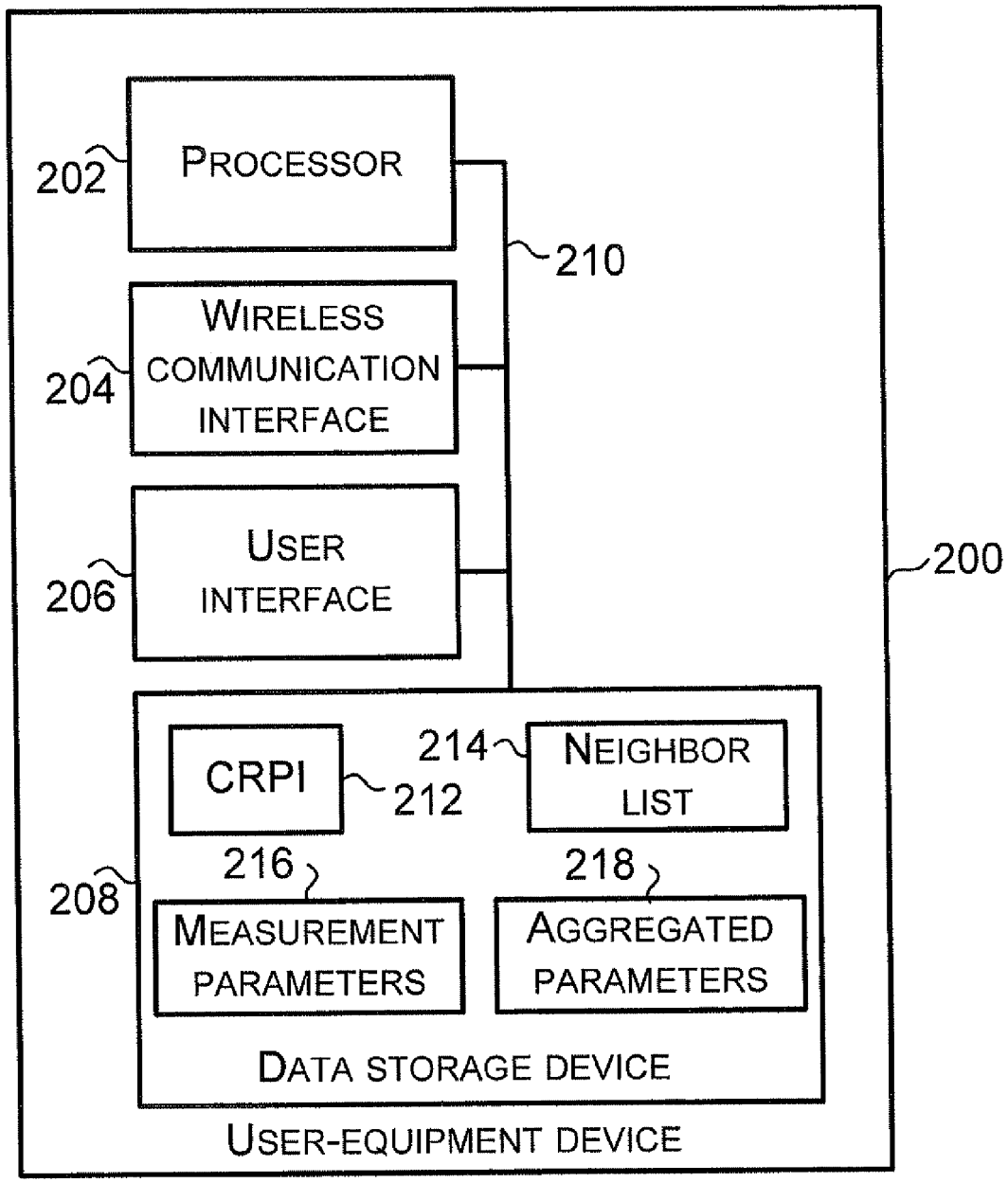
FIG. 2 is a block diagram of a user-equipment device in accordance with one or more of the example embodiments.

Next, FIG. 2 is a block diagram of a user-equipment (UE) device 200 in accordance with one or more of the example embodiments. UE device 200 includes a processor 202, a wireless communication interface 204, a user interface 206, and a data storage device 208, all of which can be linked together via a system bus, network, or other connection mechanism 210. UE device 200 can operate within system 100. One or more of the UE devices shown in FIG. 1 can be configured as UE device 200. UE device 200 can comprise or be configured as a cellular telephone, a personal digital, a tablet computing device, or a laptop computer.

Processor 202 can comprise one or more general purpose processors (for example, INTEL single core microprocessors or INTEL multicore microprocessors) or one or more special purpose processors (for example, application specific integrated circuits (ASICs) or digital signal processors (DSPs)). Processor 202 can execute computer-readable program instructions, such as computer-readable program instructions (CRPI) 212.

Wireless communication interface 204 can include one or more components for transmitting data to a base station of a wireless communication network and for receiving data from a base station of the wireless communication network. Those components can include a transmitter and a receiver, distinct from one another, or a transceiver including both a transmitter and a receiver. Wireless communication interface 204 can be arranged as a multiple-input-multiple-output (MIMO) system including multiple transmit antennas (for example, 2 or 4 antennas) and multiple receive antennas (for example, 2 or 4 antennas).

User interface (UI) 206 can include one or more components for a user of UE device 200 to input data or information to UE device 200. Those component(s) can be referred to as UI input component(s). As an example, the UI input components can include a touchscreen (for example, a capacitive touchscreen or a resistive touchscreen) to input selections made by the user. As another example, the UI input components can include a power switch to power on and power off UE device 200. As another example, the UI input components can include a microphone to receive voice communication, spoken by the user, for transmission within system 100.

User interface 206 can include one or more components to present data or information to the user of UE device 200. Those component(s) can be referred to as UI output component(s). As an example, the UI output components can include an audio speaker to output audible sounds such as voice communications and streaming music received via wireless communication interface 204. As another example, the UI output components can include a display device, such as a thin film transistor display, a thin film diode display, an organic light-emitting diode display, a capacitive touch screen, or a resistive touchscreen.

Data storage device 208 can comprise a non-transitory computer-readable storage medium readable by processor 202. The computer-readable storage medium can comprise volatile and/or non-volatile storage components, such as optical, magnetic, organic or other memory or disc storage, which can be integrated in whole or in part with processor 202. Data storage device 208 may also or alternatively be provided separately, as a non-transitory machine readable medium. Data storage device 208 can include CRPI 212 and a neighbor list 214.

Figure 5:
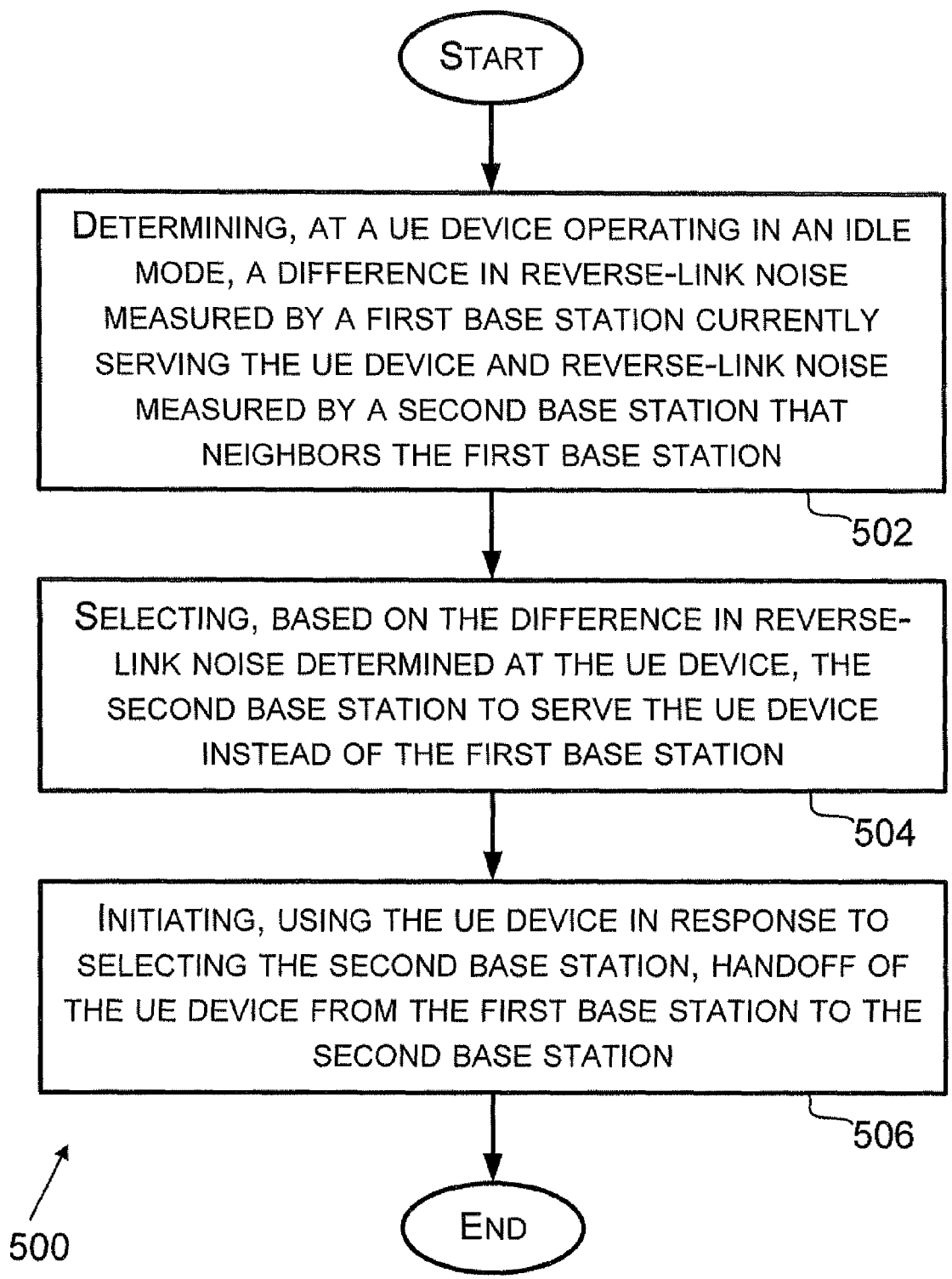
FIG. 5 is a flowchart depicting a set of functions that can be carried out in accordance with one or more of the example embodiments.

CRPI 212 can comprise a variety of program instructions, executable by processor 202, to cause the elements of UE device 200 to perform one or more of the functions described herein, including one or more of the functions shown in FIG. 5.

CRPI 212 can comprise program instructions to allow a user to engage in communication sessions using UE device 200, and to cause UE device 200 to operate in an idle mode while UE device 200 is not engaging in a communication session. Operating in the idle, mode can include UE device 200 performing discontinuous reception (DRX) to conserve power in a battery of UE device 200. As an example, UE device 200 can operate in a low power mode and can wake up every 1.28 seconds (or other defined cycle period) to check for any page messages destined to UE device 200. If UE device 200 detects a page message while awake during a DRX cycle, UE device 200 can then process the page message. Otherwise, UE device 200 can return to the low power mode before waking up again for the next DRX cycle.

CRPI 212 can comprise program instructions to receive reverse-link measurement parameters from a base station serving UE device 200. While being served by base station 104, wireless communication interface 204 can receive the reverse-link measurement parameters via the forward-link of air interface 116. Execution of CRPI 212 can cause the reverse-link measurement parameters, received at wireless communication interface 204, to be provided to processor 202 or data storage device 208. Any data provided to data storage device 208 can be stored at data storage device 208. In particular, the reverse-link measurement parameters provided to data storage device 208 can be stored with measurement parameters 216. As an example, the reverse-link measurement parameters can include parameters for reverse-link noise measurements.

The reverse-link noise measurements received at UE device 200 can be arranged in various configurations. For example, the reverse-link noise measurements can indicate the noise measured on the reverse-links to the base station serving UE device 200 ($RLN_{Serving}$) and noise measured on the reverse-links to a base station neighboring the base station serving UE device 200 (($RLN_{Neighbor(x)}$), where x=a number 1 to n, and n=the number of base stations considered to neighbor the base station serving UE device 200. As another example, the reverse-link noise measurements can indicate a difference between reverse-link noise measurements of the base station serving UE device 200 and a neighboring base station. For instance, the difference can equal $RLN_{Serving}-RLN_{Neighbor(x)}$ or $RLN_{Neighbor(x)}-RLN_{Serving}$. The reverse-link noise measurements can, for example, be specified as a number of decibels (dB).

CRPI 212 can comprise program instructions to receive forward-link measurement parameters from a base station serving UE device 200. Execution of CRPI 212 can cause the forward-link measurement parameters, received at wireless communication interface 204, to be provided to processor 202 or data storage device 208 (for storing as measurement parameters 216).

CRPI 212 can include program instructions to provide the received reverse-link noise measurements to data storage device 208 and to determine an arithmetic mean (that is, average or mean) of a given number of most-recently received noise measurements for a base station or noise measurement differences. As an example, the given number can be 3. In that case, if the 5 most recent noise measurement differences for base stations 102 and 104 are 12 dB, 8 dB, 11 dB, 4 dB, and 3 dB, then execution of the CRPI 212 can cause processor 202 to determine the mean for those noise measurement differences to be 6 dB (that is, (11 dB+4 dB+3 dB)/3=6 dB). The arithmetic means can be provided to data storage device 208 and stored as aggregated parameters 218.

Neighbor list 214 can comprise data indicating which base stations of system 100 are neighbors to the base station serving UE device 200. In accordance with an embodiment in which base station 102 is serving UE device 200, the neighbor base stations for UE device 200 can be base stations 104 and 106. Tables 1 and 2 illustrate examples of neighbor list 214. The data in Tables 1 and 2 identify that base station 102 is the base station serving UE 200 and base stations 104 and 106 are the neighbor base stations. The "Null" values in Tables 1 and 2 indicate that no data is stored in that field of the table. The "Null" values can change when or in response to UE device handing over to another base station.

Table 1 illustrates that neighbor list 214 includes the most-recent reverse-link noise measurements and an average of the most-recent reverse-link noise measurements for the serving and neighboring base stations. Table 2 illustrates that neighbor list 214 includes the most-recent differences in reverse-link noise measurements and an average of the most-recent differences in reverse-link noise measurements for the serving and neighboring base stations.

TABLE 1

| $BS_{Serving}$ | $BS_{Neighbor}$ | $RLN_{(1)}$ | $RLN_{(2)}$ | $RLN_{(3)}$ | $RLN_{(Mean)}$ |
|---|---|---|---|---|---|
| 102 | Null | 15 dB | 10 dB | 9 dB | 11.3 dB |
| Null | 104 | 4 dB | 6 dB | 6 dB | 5.3 dB |
| Null | 106 | 13 dB | 3 dB | 6 dB | 7.3 dB |

TABLE 2

| $BS_{Serving}$ | $BS_{Neighbor}$ | $RLN_{DIFF(1)}$ | $RLN_{DIFF(2)}$ | $RLN_{DIFF(3)}$ | $RLN_{DIFF(Mean)}$ |
|---|---|---|---|---|---|
| 102 | Null | Null | Null | Null | Null |
| Null | 104 | 11 dB | 4 dB | 3 dB | 6 dB |
| Null | 106 | 2 dB | 7 dB | 3 dB | 4 dB |

Referring to the data in Tables 1 and 2, the values of $RLN_{DIFF(x)}$ are determined by subtracting the measured reverse-link noise for the neighbor base station from the measured reverse-link noise for the serving base station. The value of (x)=1 to n, wherein n=the number of measurements to be used to determine the arithmetic mean. The values of $RLN_{DIFF(x)}$ can be negative. In accordance with other embodiments, the values of $RLN_{DIFF(x)}$ can be determined by subtracting the measured reverse-link noise for the serving base station from the measured reverse-link noise for the neighbor base station.

The reverse-link noise measurement data in Tables 1 and 2 can be stored in area of data storage device 208 that is distinct from neighbor list 214, such as measurement parameters 216. CRPI 212 can comprise program instructions to calculate the values of $RLN_{(Mean)}$, $RLN_{DIFF(1)}$, $RLN_{DIFF(2)}$, $RLN_{DIFF(3)}$, and $RLN_{DIFF(Mean)}$ from the values of $RLN_{(1)}$, $RLN_{(2)}$, and $RLN_{(3)}$ received at wireless communication interface 204. In response to UE device 200 being handed off from base station 102 to a neighbor base station, such as base station 104, the data in the example neighbor lists shown in Tables 1 and 2 can be updated to indicate that base station 102 is a $BS_{Neighbor}$ and base station 104 is the $BS_{Serving}$.

CRPI 212 can comprise program instructions to select another base station to be the base station serving UE device 200. Selecting another base station can be referred to as reselecting a base station. Executing the program instruction to select the other base station can include processor 202 determining the base station that, most recently, is experiencing the highest quality of service (for example, the lowest amount of reverse-link noise). Considering the reverse-link noise measurement data in Table 1, processor 202 can select base station 104 as the next base station to serve UE device 200 because the lowest average reverse-link noise was measured for base station 104.

Considering the reverse-noise measurement data in Table 2, processor 202 can select base station 104 as the new serving base station since the largest difference in measured reverse-link noise is for the pair of base stations 102 and 104. In accordance with the embodiments in which the values of $RLN_{DIFF(x)}$ are determined by subtracting the measured reverse-link noise for the serving base station from the measured reverse-link noise for the neighbor base station, processor 202 can select a base station as the new serving base station if that base station has the smallest difference (or largest negative) value of $RLN_{DIFF(x)}$.

Figure 3:
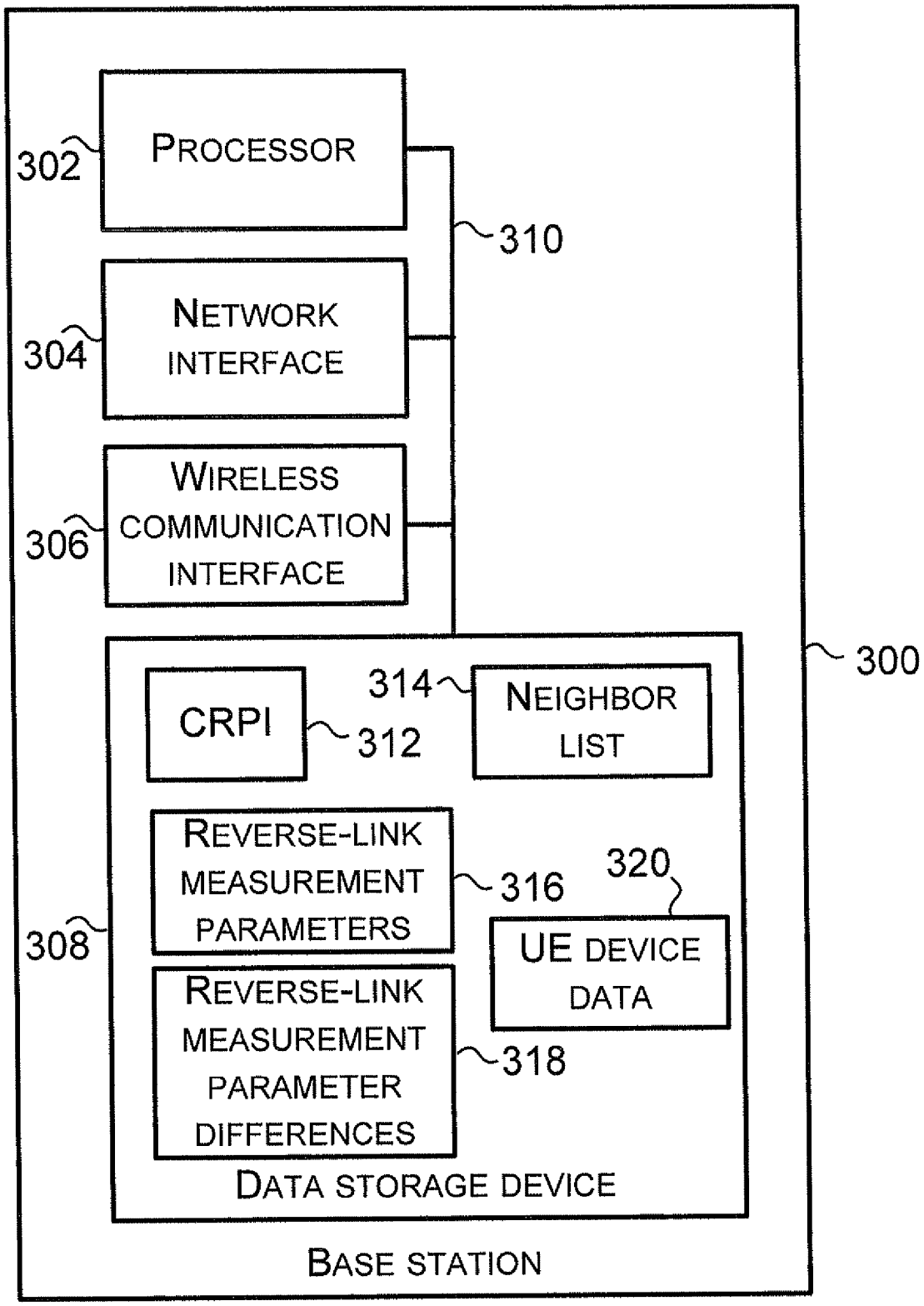
FIG. 3 is a block diagram of a base station in accordance with one or more of the example embodiments.

Next, FIG. 3 is a block diagram of a base station 300 in accordance with one or more example embodiments described herein. Base station 300 comprises a processor 302, a network interface 304, a wireless communication interface 306, and a data storage device 308, all of which can be linked together via a system bus, network, or other connection mechanism 310. For the example embodiments using the LTE protocol, the base station serving a UE device can be referred to as "eNodeB" or "eNB."

Processor 302 can comprise one or more general purpose processors (for example, INTEL single core microprocessors or INTEL multicore microprocessors) or one or more special purpose processors (for example, ASICs or DSPs). Processor 302 can execute computer-readable program instructions, such as computer-readable program instructions (CRPI) 312.

Network interface 304 can comprise a wired or wireless interface for communicating with a network infrastructure (such as a switch, gateway, mobility manager, or the like), which provides connectivity or facilitates communication with one or more of the transport networks 136.

Wireless communication interface 306 can engage in air interface communication with base stations such as those shown in FIG. 1. As such, wireless communication interface 306 can include an antenna structure and a chipset arranged to support wireless communication according to one or more air interface protocols, such as those discussed above for instance. The chipset can, for example, include a power amplifier and a cell site modem.

Data storage device 308 can comprise a non-transitory computer-readable storage medium readable by processor 302. The computer-readable storage medium can comprise volatile and/or non-volatile storage components, such as optical, magnetic, organic or other memory or disc storage, which can be integrated in whole or in part with processor 302. Data storage device 308 may also or alternatively be provided separately, as a non-transitory machine readable medium.

Data storage device 308 can include CRPI 312, a neighbor list 314, reverse-link measurement parameters 316, reverse-link noise measurement differences, and UE device data 320. Other examples of data that can be contained in data storage device 308 are also possible, some of which are described in other parts of this description.

Figure 4:
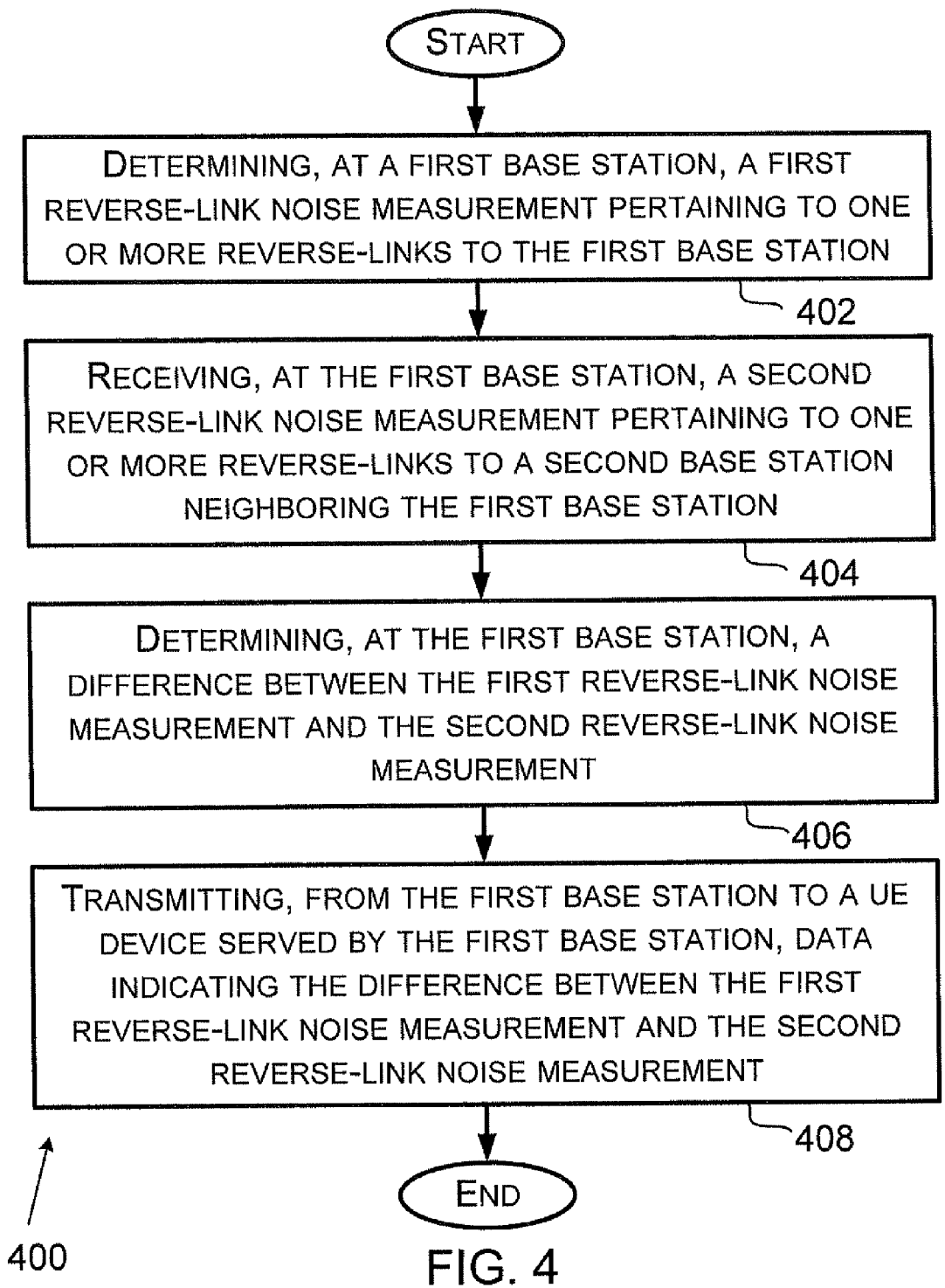
FIG. 4 is a flowchart depicting a set of functions that can be carried out in accordance with one or more of the example embodiments.

CRPI 312 can comprise a variety of program instructions, executable by processor 302, to cause the elements of base station 300 to perform one or more of the functions described herein, including one or more of the functions shown in FIG. 4.

CRPI 312 can comprise program instructions to receive reverse-link measurement parameters from one or more neighbor base station, such as one of the base stations shown in FIG. 1. The neighbor base station can transmit the reverse-link measurement parameters to network interface 304. Execution of CRPI 312 can cause the reverse-link measurement parameters, received at network interface 304, to be provided to processor 302 or data storage device 308. Any data, such as reverse-link measurement parameters, provided to data storage device 308 can be stored at data storage device 308.

In one respect, some or all of the reverse-link measurement parameters received at network interface 304 can be unsolicited. In another respect, some or all of the reverse-link measurement parameters received at network interface 304 can be received in response to base station 300 requesting the reverse-link measurement parameters. In that regard, CRPI 312 can comprise program instructions to generate a request for reverse-link measurement parameters to cause network interface 304 to transmit the request to one or more neighbor base stations. As an example, the reverse-link measurement parameters can comprise reverse-link noise measurement parameters that indicate reverse-link noise measured by a base station.

CRPI 312 can comprise program instructions to determine reverse-link measurement parameters for reverse links to wireless communication interface 306, provide the determined reverse-link measurement parameters to data storage device 308 for storage as reverse-link measurement parameters 316, generate a message comprising one or more of the determined reverse-link measurement parameters, and transmit, using network interface 304, the message comprising one or more of the determined reverse-link measurement parameters to one or more neighbor base stations. Examples of the reverse-link noise measurement parameters are shown in Table 1 (for example, $RLN_{(1)}$, $RLN_{(2)}$, and $RLN_{(3)}$).

CRPI 312 can comprise program instructions to determine differences between reverse-link noise measurement parameters for reverse links to wireless communication interface 306 and reverse-link noise measurement parameters from a neighbor base station, provide the determined differences to data storage device 308 for storage as reverse-link measurement parameter differences 318, generate a message comprising one or more determined differences, and transmit, using network interface 304, the message comprising the one or more determined differences. Examples of the determined reverse-link parameter differences are shown in Table 2 (for example, $RLN_{DIFF(1)}$, $RLN_{DIFF(2)}$, and $RLN_{DIFF(3)}$).

UE device data 320 can comprise data that identifies the UE devices being served by base station 300 and whether each UE device is engaged in a communication session or is operating in an idle mode. UE device data 320 can include data that indicates or that can be used to determine when each UE device is operating in an idle mode and will transition to or operate in a discontinuous reception (DRX) mode. CRPI 312 can comprise program instructions that are executable to refer to UE device data 320 to determine when UE device 200 is operating in the idle mode and the DRX mode. Processor 302 can execute the program instructions to send reverse-link measurement parameters or differences to UE device 200 while UE device 200 is operating in the idle and DRX modes.

In addition to operating as a serving base station that serves UE device 200, a base station, such as base station 300, can operate as a neighbor base station to one or more other base stations. Those other base stations can transmit reverse-link measurement parameters obtained from base station 300 to UE devices serviced by those other base stations so that those UE devices can make a determination whether to select a new base station. Therefore, CRPI 312 can include program instructions to cause network interface 304 to transmit the reverse-link measurement parameters from base station 300 to another base station via inter-base-station communication link 132.

III. Example Operation

Next, FIG. 4 is a flow diagram depicting a set of functions 400 that can be carried out in accordance with one or more example embodiments. The functions identified in FIG. 4 refer to a UE device, a first base station, and a second base station. For purposes of describing FIG. 4, the UE device is referred to as UE device 200, the first base station is referred to as base station 102, and the second base station is referred to as base station 104. As indicated above, base stations 102 and 104 can be arranged like base station 300, and therefore, contain the elements of base station 300.

In FIG. 4, block 402 includes determining, at base station 102, a first reverse-link noise measurement pertaining to one or more reverse-links to base station 102. Processor 302 can execute program instructions 312 to determine the noise measurements. Execution of those program instructions can include referring to signals provided to base station 102 from UE devices via the reverse-links. Base station 102 may measure reverse-link noise while one or more UE devices serve by base station 102 are idle and operating in a DRX mode.

Block 404 includes receiving, at base station 102, a second reverse-link noise measurement pertaining to one or more reverse-links to base station 104 neighboring base station 102. Processor 302 can execute program instructions 312 to receive the second reverse-link noise measurement via network interface 304. In that regard, network interface 304 can receive the second reverse-link noise measurement via transmission of that measurement via inter-base-station communication link 132 or a communication link 134.

Block 406 includes determining, at base station 102, a difference between the first reverse-link noise measurement and the second reverse-link noise measurement. Processor 302 can execute program instructions 312 to determine the difference. In one respect, processor 302 can execute CRPI 312 to determine the difference by subtracting the first reverse-link noise measurement from the second reverse-link noise measurement. In another respect, processor 302 can execute CRPI 312 to determine the difference by subtracting the second reverse-link noise measurement from the first reverse-link noise measurement.

A person skilled in the art will understand that the amount of noise experienced by the reverse-links to a base station can vary over time. As the noise on the reverse-links to base station 102 increases, the noise on the reverse-links to a neighboring base station can decrease. Providing a UE device with information regarding those noise levels can lead to the UE device selecting the base station experiencing less noise on the reverse-links to be a new serving base station for the UE device.

Base station 102 can be configured to determine additional differences of distinct reverse-link noise measurements. For example, base station 102 can determine multiple differences of distinct reverse-link noise measurements for a given pair of base stations, such as base stations 102 and 104. As another example, base station 102 can determine differences of distinct reverse-link noise measurements for more than one pair of base stations. For instance, base station 102 can determine differences of reverse-link noise measurements for base stations 102 and 104 and differences for base stations 102 and 106.

Block 408 includes transmitting, from base station 102 to UE device 200 served by base station 102, data indicating the difference between the first reverse-link noise measurement and the second reverse-link noise measurement. Processor 302 can execute program instructions 312 to cause wireless communication interface 306 to transmit the data. In accordance with the LTE implementation, transmission of the data indicating the difference can occur over a physical downlink control channel (PDCCH) between UE device 200 and base station 102, and that transmission can include transmitting a paging radio network temporary identifier (PRNTI) having the difference encoded within the PRNTI.

In an alternative arrangement, the base station serving UE device 200 can transmit the first and second reverse-link noise measurements to UE device 200. In accordance with that alternative arrangement, UE device 200 can compare the first and second reverse-link noise measurements to determine whether UE device 200 should select a new base station to be the serving base station. Alternatively, UE device 200 can determine the difference between the first and second reverse-link noise measurements for use in determine whether a new serving base station should be selected.

In accordance with one or more example embodiments, transmitting data indicating the difference can occur while UE device 200 has awaken during a DRX cycle. Processor 302 can refer to UE device data 320 to determine when UE device 200 awakes for the DRX cycle and then transmit the data indicating the difference while UE device 200 is awake during the DRX cycle so that UE device 200 can receive the transmitted data.

Although FIG. 4 provides an example of when the reverse-link measurement parameters are reverse-link noise measurements, a person having ordinary skill in the art will understand that the functions of FIG. 4 can be carried out for other reverse-link measurement parameters as well or in addition to the reverse-link noise measurements.

Next, FIG. 5 is a flow diagram depicting a set of functions 500 that can be carried out in accordance with one or more example embodiments. The functions identified in FIG. 5 refer to a UE device, a first base station, and a second base station. For purposes of describing FIG. 5, the UE device is referred to as UE device 200, the first base station is referred to as base station 102, and the second base station is referred to as base station 104.

In FIG. 5, block 502 includes determining, at UE device 200 operating in an idle mode, a difference in reverse-link noise measured by base station 102 currently serving UE device 200 and reverse-link noise measured by base station 104 that neighbors base station 102. Processor 202 can execute program instructions 212 to determine the difference in the reverse-link noise measurements.

In order to determine the difference in reverse-link noise measurements, wireless communication interface 204 can receive the difference in reverse-link noise measurements, as determined by base station 102. For instance, the difference in reverse-link noise can comprise data indicating a difference between a first reverse-link noise measurement and a second reverse-link noise measurement. In that regard, the first reverse-link noise measurement pertains to one or more reverse-links to the base station 102, and the second reverse-link noise measurement pertains to one or more reverse-links to base station 104.

Alternatively, in order to determine the difference in reverse-link noise measurements, wireless communication interface 204 can receive data indicating the first reverse-link noise measurement pertaining to the one or more reverse-links to base station 102, and data indicating the second reverse-link noise measurement pertaining to the one or more reverse-links to base station 104, and then determine the difference between those two measurements.

Execution of CRPI 212 to determine the difference in reverse-link noise measurements can occur during a DRX cycle. In that regard, UE device 200 can receive reverse-link noise measurement data while awake during a DRX cycle. Moreover, UE device can receive reverse-link noise measurements during a plurality of DRX cycles while UE device is operating in an idle mode. Data storage device 208 can be configured to store a plurality of the received noise measurements or a sum of a given number of the most-recently received noise measurements.

Furthermore, the base station serving UE device 200 (for example, base station 102) can have more than one neighboring base station. Each of those base stations neighboring base station 102 can measure reverse-link noise and provide the reverse-link noise measurements to base station 102. Base station 102 can transmit the reverse-link noise measurements from the other neighboring base stations to UE device 200 to provide UE device with information for determining differences in reverse-link noise between base station 102 and those other neighboring base stations. Alternatively, base station 102 can determine the differences in reverse-link noise between base station 102 and those other neighboring base stations and transmit those differences to UE device 200.

Block 504 includes selecting, based on the difference in reverse-link noise determined determined at UE device 200, base station 104 to serve UE device 200 instead of base station 102. Processor 202 can execute program instructions 212 to select base station 104. Execution of those program instructions can cause UE device 200 to select a base station that can provide a greater quality of service than the serving base station.

In one respect, the greater quality of service can be based on the reverse-links to the selected base station relative to the quality of service that can be provided by reverse-links to the serving base station. The quality of service for each base station can be based, at least in part, on the noise measured on the reverse-links to that base station. In that regard, selecting the second base station based on the difference in reverse-link noise comprises can include determining that the first reverse-link noise measurement is greater than the second reverse-link noise measurement.

In another respect, the greater quality of service can be based on the forward-links to the selected base station relative to the quality of service that can be provided by forward-links to the serving base station. In addition to receiving parameters regarding reverse-links of the serving and neighboring base stations, UE device 200 can receive parameters regarding forward-links of the serving and neighboring base stations. The parameters regarding the forward-links can identify noise measured on the forward-links or some other parameter regarding quality of the forward-links. As an example, the forward-link parameters can comprise a Reference Signal Received Power (RSRP) parameter or a Reference Signal Received Quality (RSRQ) parameter.

Block 506 includes initiating, using UE device 200 in response to selecting base station 104, handoff of UE device 200 from base station 102 to base station 104. Processor 202 can execute program instructions 212 to initiate the handoff. Execution of those program instructions can cause processor 202 to generate a message to request handoff of UE device 200 from base station 102 to base station 104, and to cause wireless communication interface 204 to transmit the message to request handoff to base station 102. Execution of those program instructions can cause UE device 200 to synchronize to base station 104. Synchronization to base station 104 can include decoding synchronization signals (such as a primary synchronization signal and a secondary synchronization signal) transmitted by base station 104. Decoding the synchronization can allow UE device 200 to establish appropriate frequency and time synchronization with base station 104. After initiating hand off, the user device can hand off to the other base station.

Although FIG. 5 provides an example of when the reverse-link measurement parameters are reverse-link noise measurements, a person having ordinary skill in the art will understand that the functions of FIG. 5 can be carried out for other reverse-link measurement parameters as well or in addition to the reverse-link noise measurements.

In accordance with one or more of the example embodiments, the UE device can continue to be served by the serving base station if the reverse-link measurement parameters, reverse-link measurement parameters differences, forward-link measurement parameters, or forward-link measurement parameters differences being compared indicate that the quality of service being provided by the serving base station exceeds or is not surpassed by the quality of service that might be provided by a neighbor base station by a threshold amount. Subsequent comparisons based on updated parameters or parameter differences may result in the UE device handing over to a neighbor base station.

IV. Conclusion

Example embodiments have been described above. Those skilled in the art will understand that changes and modifications can be made to the described embodiments without departing from the true scope and spirit of the present invention, which is defined by the claims.

We claim:

1. A method comprising:
determining, at a first base station that is serving a first user-equipment device operating in an idle mode, a first reverse-link noise measurement pertaining to one or more reverse-links to the first base station;
receiving, at the first base station, a second reverse-link noise measurement pertaining to one or more reverse-links to a second base station, wherein the one or more reverse-links to the second base station are between at least one other user-equipment device and the second base station, and wherein the second base station neighbors the first base station;
determining, at the first base station, a difference between the first reverse-link noise measurement and the second reverse-link noise measurement; and
transmitting, from the first base station to the first user-equipment device operating in the idle mode, data indicating the difference between the first reverse-link noise measurement and the second reverse-link noise measurement.

2. The method of claim 1, wherein receiving the second reverse-link measurement comprises receiving the second reverse-link measurement via a communication link between the first base station and the second base station.

3. The method of claim 2, wherein the communication link comprises an X2 link of a long term evolution (LTE) network.

4. The method of claim 1, further comprising:
transmitting, from the first base station to at least one other base station, the first reverse-link noise measurement.

5. The method of claim 4, wherein transmitting the data indicating the difference occurs over a physical downlink control channel (PDCCH) between the first user-equipment device and the first base station.

6. The method of claim 5,
wherein transmitting the data indicating the difference includes transmitting a paging radio network temporary identifier (PRNTI); and
wherein the difference is encoded within one or more bits of the PRNTI.

7. The method of claim 4, wherein the at least one other base station comprises the second base station.

8. The method of claim 1, further comprising:
determining, at the first base station, the first user-equipment device has transitioned to a discontinuous reception mode while the first user-equipment device is operating in an idle mode,
wherein transmitting the data indicating the difference between the first reverse-link noise measurement and the second reverse-link noise measurement occurs while the first user-equipment device is operating in the discontinuous reception mode.

9. The method of claim 1, wherein the first base station serving the first user-equipment device includes the first base station sending the first user-equipment device a page message while the first user-equipment device is operating in an idle mode.

10. A method comprising:
receiving at a user-equipment device operating in an idle mode, from a first base station serving the user-equipment device, data for determining a difference between reverse-link noise measured by the first base station while the user-equipment device is operating in the idle mode and reverse-link noise measured by a second base station that does not serve the user-equipment device while the first base station is serving the user-equipment device, wherein the second base station neighbors the first base station;
determining, at the user-equipment device operating in the idle mode, the difference between the reverse-link noise measured by the first base station while the user-equipment device is operating in the idle mode and the reverse-link noise measured by the second base station that does not serve the user-equipment device while the first base station is serving the user-equipment device,
selecting, at the user-equipment device based on the determined difference between the reverse-link noise measured by the first base station while the user-equipment device is operating in the idle mode and the reverse-link noise measured by the second base station, the second base station to serve the user-equipment device instead of the first base station; and
initiating, using the user-equipment device in response to selecting the second base station, synchronization of the user-equipment device to the second base station.

11. The method of claim 10,
wherein determining the difference between the reverse-link noise measured by the first base station while the user-equipment device is operating in the idle mode and the reverse-link noise measured by the second base station comprises receiving, at the user-equipment device, data indicating a difference between a first reverse-link noise measurement and a second reverse-link noise measurement,
wherein the first reverse-link noise measurement pertains to one or more reverse-links to the first base station,
wherein the second reverse-link noise measurement pertains to one or more reverse-links to the second base station, and
wherein the one or more reverse-links to the second base station are between at least one other user-equipment device and the second base station.

12. The method of claim 11, wherein selecting the second base station based on the determined difference comprises determining that the first reverse-link noise measurement is greater than the second reverse-link noise measurement.

13. The method of claim 11, wherein receiving the data indicating the difference occurs while the user-equipment device is awake during a discontinuous reception cycle.

14. The method of claim 10, further comprising:
determining, at the user-equipment device, first forward-link measurement data for the first base station and second forward-link measurement data for the second base station;
wherein selecting the second base station is further based on the first forward-link measurement data and the second forward-link measurement data.

15. The method of claim 10, further comprising:
initiating handoff of the user-equipment device, wherein initiating handoff of the user-equipment device comprises transmitting, from the user-equipment device to the first base station, a request to handoff the user-equipment device to the second base station.

16. The method of claim 10, wherein initiating synchronization of the user-equipment device to the second base station includes at least one of (i) receiving, by the user-equipment device, a synchronization signal transmitted by the second base station, (ii) decoding, by the user-equipment device, a synchronization signal transmitted by the second base station, and (iii) establishing, by the user-equipment device, frequency and time synchronization with the second base station.

17. A user-equipment device comprising:
a wireless communication interface to receive, from a first base station currently serving the user-equipment device while the user-equipment device is operating in an idle mode, first reverse-link noise data that indicates a difference in reverse-link noise measured by the first base station currently serving the user-equipment device and reverse-link noise measured by a second base station that does not serve the user-equipment device while the first base station serves the user-equipment device, wherein the second base station neighbors the first base station;
a processor; and
a data storage device storing computer-readable program instructions executable by the processor to perform a set of functions, the set of functions comprising:
selecting, based on the first reverse-link noise data received by the wireless communication interface while the user-equipment device is operating in an idle mode, the second base station to serve the user-equipment device instead of the first base station; and
initiating, in response to selecting the second base station, synchronization of the user-equipment device to the second base station.

18. The user-equipment device of claim 17,
wherein the set of functions further comprises:
initiating handoff of the user-equipment device, wherein initiating handoff of the user-equipment device comprises transmitting, from the wireless communication interface to the first base station, a request to hand off the user-equipment device to the second base station, and synchronizing the user-equipment device to the second base station.

19. The user-equipment device of claim 17,
wherein the wireless communication interface receives second reverse-link noise data that indicates at least one more difference in reverse-link noise measured by the first base station and reverse-link noise measured by at least one additional base station that neighbors the first base station, and
wherein selecting the second base station to serve the user-equipment device further comprises comparing the first reverse-link noise data to the second reverse-noise link data so as to determine that the reverse-link noise measured by the second base station is less than the reverse-link noise measured by the first base station and less than the reverse-link noise measured by each of the at least one additional base station.

20. The user-equipment device of claim 19,
wherein the wireless communication interface receives forward-link measurement data from the first base station, and
wherein selecting the second base station to serve the user-equipment device instead of the first base station is further based on the forward-link noise measurement data.

21. The user-equipment device of claim 17,
wherein the set of functions further comprises:
adding the difference in reverse-link noise measured by the first base station and the reverse-link noise measured by the second base station to a value indicating at least one other difference in reverse-link noise measured by the first base station and reverse-link noise measured by the second base station so as to determine a sum of differences in reverse-link noise measured by the first base station and the reverse-link noise measured by the second base station,
wherein selecting the second base station, based on the first reverse-link noise data, comprises using the sum of differences in reverse-link noise to select the second base station.

22. The user-equipment device of claim of claim 21,
wherein the set of functions further comprises:
waking up the user-equipment device during periodic discontinuous reception (DRX) cycles,
wherein the wireless communication interface receives the first reverse-link noise data while the user-equipment device is awake during a DRX cycle.

23. The user-equipment device of claim 17,
wherein initiating synchronization of the user-equipment device to the second base station includes at least one of (i) receiving, by the user-equipment device, a synchronization signal transmitted by the second base station, (ii) decoding, by the user-equipment device, a synchronization signal transmitted by the second base station, and (iii) establishing, by the user-equipment device, frequency and time synchronization with the second base station.

* * * * *